United States Patent [19]

Eberhard et al.

[11] 4,286,197
[45] Aug. 25, 1981

[54] TWO-COORDINATE POSITIONING DEVICE

[76] Inventors: Riessland Eberhard, Karl-Rüdrich-Strasse 34, DDR-8010 Dresden; Helmut Beyer, Kurt-Schlosser-Strasse 19, DDR-8010 Dresden; Erich Kossman, Hohe Strasse 28, DDR-8027 Dresden, all of German Democratic Rep.

[21] Appl. No.: 15,283

[22] Filed: Feb. 26, 1979

[30] Foreign Application Priority Data

Feb. 28, 1978 [DD] German Democratic Rep. ... 203869

[51] Int. Cl.³ .............................................. H02K 41/00
[52] U.S. Cl. ..................................... 318/38; 318/115; 318/135; 310/12
[58] Field of Search ................................. 310/12–14; 318/115, 37, 38, 135

[56] References Cited

U.S. PATENT DOCUMENTS

| 3,851,196 | 11/1974 | Hindi | 318/115 X |
| 3,881,139 | 4/1975 | Inaba et al. | 318/115 X |

*Primary Examiner*—Donovan F. Duggan
*Attorney, Agent, or Firm*—Michael J. Striker

[57] ABSTRACT

A positioning device with two coordinates, for the moving of two components relative to each other. The positioning device with two coordinates serves for the exact positioning of a tool or workpiece, preferably of semi-conductor discs, for the purpose of checking or fabricating in the course of the manufacturing process.

11 Claims, 7 Drawing Figures

Schnitt B-B

TWO-COORDINATE POSITIONING DEVICE

BACKGROUND OF THE INVENTION

Various designs are known of bi-axial positioning devices using electromagnetic drive systems.

The closest possibility consists in an arrangement using two mono-axial positioning systems where the second system is mounted on the movable component of the first system. This arrangement takes its cue from the customary way of designing compound tables, as applied for instance in machine tool manufacture. Applied to electromagnetic drive systems, this principle f.i. is known in several variations for the German Letters Patent No. 24 36 900. In all these designs it is of disadvantage that the lower system must always drive the entire upper drive system, i.e. that there are relatively large masses that must be moved in the direction of a coordinate.

Also known are arrangements unifying the planes of movement of both drive systems, i.e. avoiding additional mechanical parallel guides. These arrangements considerably reduce the moving masses, since the reactive component of both drive systems is standing still relative to the movement of both axes, and additional guiding elements are eliminated.

The arrangement described in the German Letters Patent No. 22 65 246 is known, where the active component of the positioning device carries the drive magnets for both coordinate directions. The reactive component, the base plate, has parallel slots, so that the surface, like a waffle iron, is covered by cube-shaped islands which are generating motive forces in conjunction with the pole systems. The system is supported on air. The disadvantage of this arrangement lies in the fact that due to the crosswise arranged slots, the forces that can be achieved will reach only one half of the value that could be achieved if the slots were arranged, like a line grid, in the direction of one coordinate. It is furthermore of disadvantage that two complete and identical pole systems must be used for every direction of movement in order to avoid torsional vibrations.

This reduction of force is avoided in the arrangement described in the U.S. Pat. No. 3,851,196. The plane of movement has therein separate zones for the drive systems of both coordinate axes so that instead of the waffle grid, a line grid can be used which will allow greater reactive forces. It is of disadvantage here, that for reasons of symmetry the base plate must be given at least three separate grid zones, which necessitates a base plate of very large dimensions when compared to the effective zone of movement of one axis. This design of the movable head necessitates two pole systems in one direction, in order to avoid torsional vibrations. In the other direction, the resulting force will act upon the center of gravity of the head, and only one pole system is required. It is the purpose of the invention, on one hand to utilize possibly small dimensions of the base plate for a given working range of the positioning device, and on the other also to avoid the reduction of force occurring by the use of the waffle grid.

SUMMARY OF THE INVENTION

It is the objective of the invention to use a base plate of normal dimensions with a possibly large working range of the two-coordinate positioning system, and also not to obtain a reduction of force due to the use of a waffle grid. Furthermore, only the minimum number of pole systems needed for movement should be used.

The invention concerns a two-coordinate positioning device, imparting relative movements according to the principle of reluctance, between two components along two coordinates. The active component and the passive component of the two-coordinate positioning device are so designed that the passive component has a minimum area determined only by the working range and the size of the active component, and allowing a maximum transmission of force in order to attain high accelerations.

The two-coordinate positioning device as per invention, has a passive component with two active surfaces having a constant vertical distance to each other. The first active surface has projections of magnetizable material in the direction of a first coordinate, and the second surface has projections in the direction of a second coordinate. An active component consists of a first pole system and a pole system separated from it, joined to each other by means of a connecting member. The projections of the first pole system are arranged above the projections of the first active surface and the projections of the second pole system above the projections of the second active surface.

The two active surfaces may, in a given instance, lie on parallel planes. The first coordinate will thus correspond to the y-axis and the second coordinate to the x-axis of a Cartesior coordinate system.

The connecting member is of elastic design in the direction perpendicular to the active surfaces, but torsionally rigid in the other directions.

The passive component consists, in given instances, of two plates in fixed arrangement to each other, of which the first plate is assigned the first active surface and the second plate the second active surface. The connecting member is herein reaching around both plates. On the surfaces opposite the active surfaces, both plates are provided with stiffening ribs. The surfaces of both plates having stiffening ribs are connected to each other.

This arrangement has the advantage that the passive component is of light and rigid design. The projections of the active surfaces can be adjusted as to position and angle. The active component has only one pole system for each direction of movement.

The momentum caused by the connecting member is compensated by having the table for holding a workpiece or tool respectively, mounted eccentrically on the first pole system. The resulting force will thus, in every instance, act in both coordinate directions upon the center of gravity of that active component which is the movable one in this design.

A further two-coordinate positioning device as per invention also has two plates with active surfaces wherein both active surfaces are pointing in the same direction. The connecting member is here reaching around one of the two plates.

A further two-coordinate positioning device as per invention also has two plates, the active surfaces of which are pointing towards each other. The active component is situated here elastically between two plates.

A further design consists of having the passive component as a hollow cylinder. The active surfaces are located here on the inner surface or the outer surface respectively. One pole system of the active component is situated within a cylindrical component in the interior of the hollow cylinder. The other pole system is situated within a pole ring encircling the hollow cylinder. A connecting member joins the cylindrical part and the pole ring. It is suitable to the purpose to mount the connecting member in a fixed manner and to arrange the passive component movable along the z-coordinate on the y-coordinate.

BRIEF DESCRIPTION OF THE DRAWING

The invention is described more closely with the aid of various embodiments shown in the drawing. Shown herein are.

DESCRIPTION OF THE PREFERRED EMBODIMENTS

Figure 1:
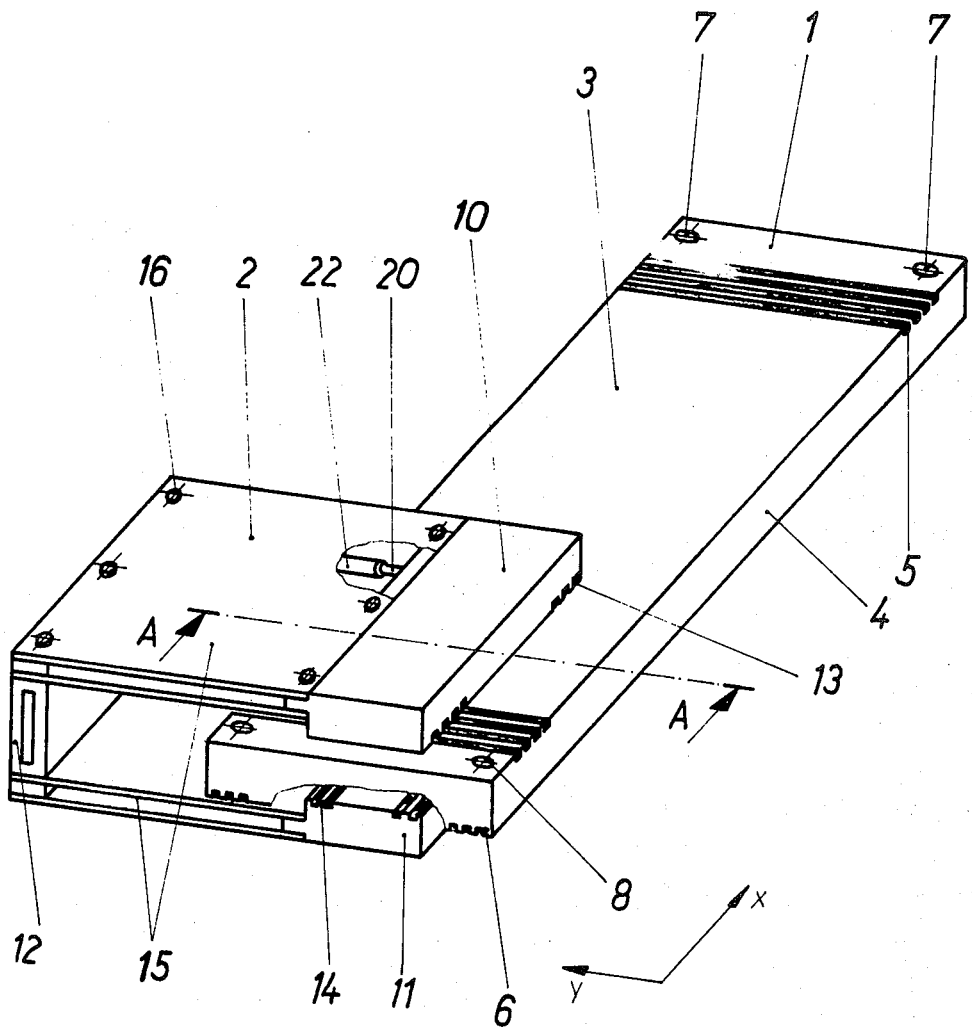
FIG. 1: A projective representation of a first embodiment of the invention.
Figure 2:
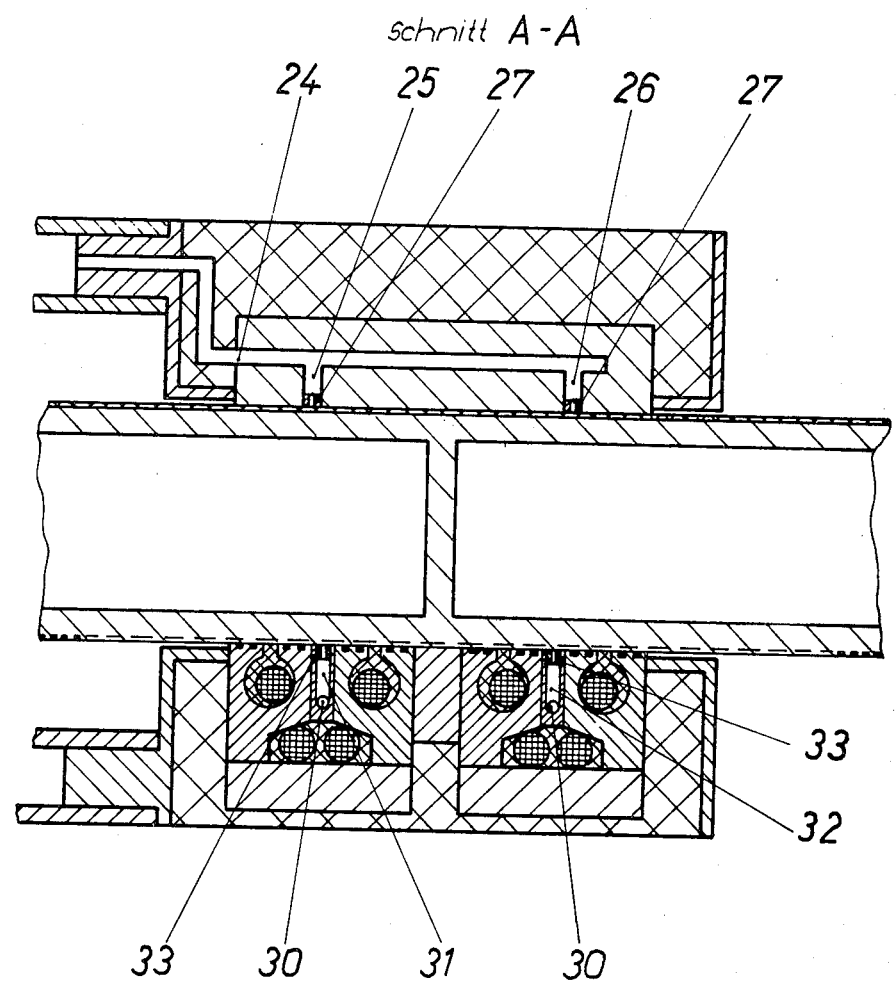
FIG. 2: A section A—A through the first embodiment as per FIG. 1.

The first embodiment shown in FIG. 1 and FIG. 2 consists of a passive component 1 and an active component 2.

The passive component 1 is a flat plate and has two active surfaces 3 and 4 at a constant distance to each other. The active surface 3 has grooves formed between identical ridges 5 arranged parallel to the direction of a first, y-coordinate. The active surface 4 has grooves formed between identical ridges 6 arranged parallel to the direction of a second, x-coordinate. The passive component 1 and the ridges 5; 6 consist of magnetizable material. The interstices between the ridges 5; 6 can be filled with a non-magnetizable material in order to obtain a flat surface on component 1.

Furthermore, bores 7; 8 are provided in the passive component 1, in order to allow attachment of the passive component to equipment.

The active component 2 consists of a first pole system 10, arranged above the active surface 3, a second pole system 11 arranged below the active surface 4, and a connecting member 12, so shaped that the connecting member 12 will transfer across the entire working range, movements of the pole system 10 in the x-direction onto the pole system 11, and movements of the pole system 11 in the y-direction onto the pole system 10. The ridges 5 are herein acting in a suitable manner conjointly with the ridges 13 of the pole system 10 and generate a movement in the direction of the x-coordinate. Likewise, the ridges 6 are acting conjointly with the ridges 14 of the pole system 11 and generate a movement in the direction of the y-coordinate. The connecting member 12 is a yoke 15 which is elastic in the z-coordinate, attached by bolts 16 to the pole systems 10; 11. The yoke 15 is therefore constructed rigid in respect to torsion. The pole systems 10; 11 have furthermore each one supply line 22 for compressed air, each connected to the pole systems 10; 11 near the yoke 15, through a sleeve 20. It is suitable to have the yoke 15 act as retainer for the supply line 22. Within the pole system 10 a central channel 24 branching into two side channels 25; 26 runs from the sleeve 20. One restrictor 27 each is located at the ends of the side channels 25; 26. Within the pole system 11, a central channel 30, branching into the side channels 31; 32 runs from the sleeve 20. One restrictor 33 each is located at the ends of the side channels 31; 32.

On applying compressed air to the central channels 24; 30, one gap each, filled with exhausting air, will form between the active surface 3 and the pole system 10 as well as between the active surface 4 and the pole system 11.

The position of the active component 2 is now determined only by the known electromagnetic forces between the pole system 10 and the ridges 5 as well as between the pole system 11 and the ridges 6. The electric wiring is also located between the elastic yoke 15.

The pole system is suitable to accommodate a support for holding tools or a table holding the workpiece, which is mounted on the pole system 10 in such a manner that it will simultaneously compensate against the momentum generated by the connecting member 12. For the movement in the x-coordinate the pole system 10 is electro-magnetically excited with an appropriate time factor, the pole system 11 maintains its state of electromagnetic excitation and merely functions as a parallel guide. For movements in the y-coordinate the excitation of the pole system 11 is changed, whilst the pole system 10 assumes the guidance function. A simultaneous change in the excitation of both pole systems 10, 11 allows arbitrary movements within the x-y plane.

Figure 3:
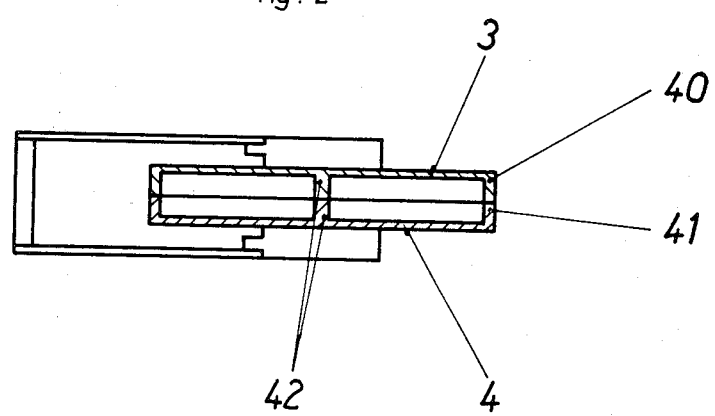
FIG. 3: A second embodiment.

In a second embodiment as per FIG. 3, the passive component is made of two plates 40; 41. The plates 40; 41 are fixed in their relative position after adjustments as to positioning and angle. Herein, plate 40 is assigned the active surface 3 and plate 41 the active surface 4, with the active surfaces 3; 4 facing outward. The plates 40; 41 are provided on the surfaces opposite the active surfaces with ribs 42 to stiffen the plates 40; 41 and they are joined at the ribbed surfaces. The active component 2 corresponds to the design as described in the first embodiment.

Figure 4:
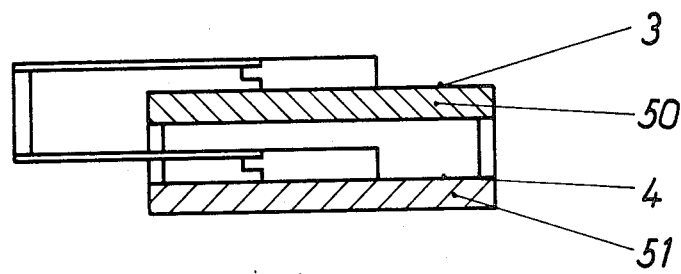
FIG. 4: A third embodiment.

In a third embodiment, as per FIG. 4, the passive component 1 is fabricated from two plates 50; 51. Herein, plate 50 is assigned active surface 3 and plate 51 active surface 4. The active surfaces 3; 4 are facing in the same direction. The connecting member 12 is reaching here around the upper plate 50 which is attached at most to 3 sides of the lower plate 51. The active component 2 is fabricated as per the examples of FIG. 1 and FIG. 3, only the ridges 13; 14 of the two pole systems 10; 11 must necessarily also face in the same direction in order to act in conjunction with the active surfaces 3; 4.

Figure 5:
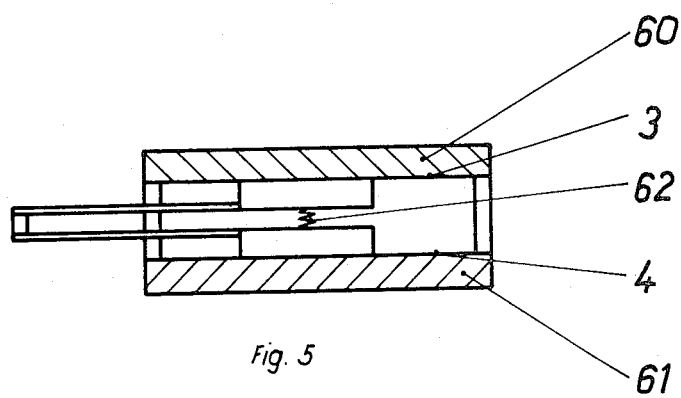
FIG. 5: A fourth embodiment.

In a fourth embodiment, as per FIG. 5, the passive component 1 is fabricated from two plates 60; 61. Herein plate 60 is assigned active surface 3 and plate 61, active surface 4. The active surfaces 3; 4 are facing each other. The active component is positioned in the space between the two plates 60; 61. The connecting member 12 between the two pole systems 10; 11 is provided with a pressure spring 62.

Figure 6:
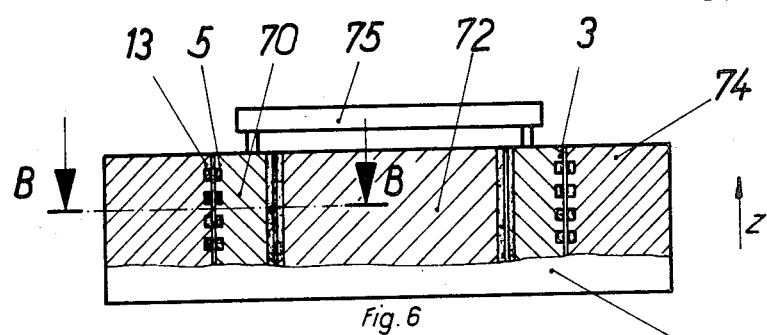
FIG. 6: A fifth embodiment.
Figure 7:
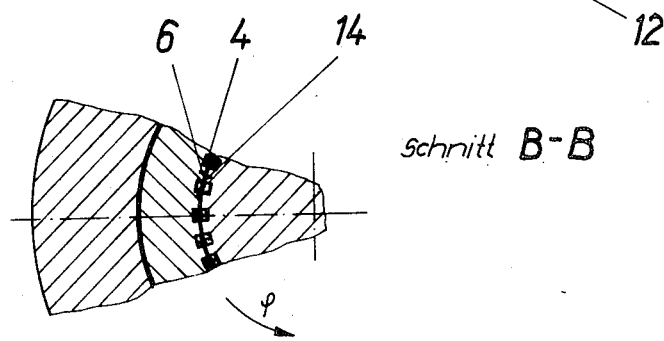
FIG. 7: The section B—B through the fifth design as per FIG. 6.

In a fifth embodiment, as per FIG. 6 and FIG. 7, the passive component consists of a hollow cylinder 70 made of magnetizable material. Here, the active surface 3 with circumferentially spaced ridges 5 is situated on the outer surface of the hollow cylinder 70 and the active surface 4 with axially extending, circumferentially spaced ridges 6 is placed on the inner surface of the hollow cylinder 70. An arrangement is also conceivable where the radial ridges 5 are lying on the inner surface, the axial ridges 6 on the outer surface of the hollow cylinder 70.

A cylindrical part 72 carries the pole system 11 with the ridges 14, which in conjunction with the ridges 6 will cause rotation, relative to the cylindrical part, and along the φ-axis, of the hollow cylinder 70.

A pole ring 74 carries the pole system 10 with the ridges 13, which, in conjunction with the ridges 5 will cause axial movement, relative to the pole ring 72 and along the z-coordinate, of the hollow cylinder 70.

The pole ring 74 and the cylindrical part 72 are linked by the connecting member 12 and represent the active component 2. It is of advantage to arrange the connecting member 12 stationarily and to design the passive component 1, consisting of the hollow cylinder 70, as a cylindrical plunger within the pole ring 74 and the cylindrical part 72. The possibility exists here to have the flange 75 carry a table.

We claim:

1. A two coordinate positioning device comprising a passive component having a first and a second active surface spaced a fixed distance in a direction transverse to the active surfaces from each other, said first active surface having spaced ridges of magnetizable material extending in the direction of a first coordinate and said second active surface having spaced ridges extending in the direction of a second coordinate; and an active component having only two electromagnetic pole systems, one of said two pole systems having on a surface thereof engaging said first active surface of said passive component ridges of magnetizable material extending in the same direction as those on said first active surface, the other of said electromagnetic pole systems being spaced in said transverse direction from said one pole system and having on a surface thereof engaging said second active surface of said passive component spaced ridges of magnetizable material extending in the same direction as those on said second active surface, and a connecting member connecting said spaced pole systems to each other, whereby said ridges of said pole systems cooperate with those on said active surfaces to generate a relative movement of said components in the direction of one or the other of said coordinates upon imparting timed impulses to the respective pole system.

2. A two coordinate positioning device as defined in claim 1, wherein said active surfaces are located in two parallel planes and said coordinates extend normal to each other.

3. A two coordinate positioning device as defined in claim 2, wherein said connecting member is elastic in a direction normal to said planes and rigid in the direction of said coordinates.

4. A two coordinate positioning device as defined in claim 3, wherein said passive component comprises two superimposed plates spaced from each other and respectively provided with said active surfaces, and wherein said connecting member encompasses said plates.

5. A two coordinate positioning device as defined in claim 4, wherein said plates are provided with stiffening ribs on surfaces opposite said active surfaces.

6. A two coordinate positioning device as defined in claim 5, wherein said stiffening ribs on said two plates are connected to each other in abutting relationship.

7. A two coordinate system as defined in claim 3, wherein said passive component comprises two superimposed plates spaced from each other and respectively provided with said active surfaces, wherein said active surfaces face in the same direction, and wherein said connecting member encompasses one of said plates.

8. A two coordinate positioning system as defined in claim 3, wherein said passive component comprises two superimposed plates spaced from each other and respectively provided with said active surfaces, wherein said active surfaces are directed toward each other, and wherein said active component is located between said two plates.

9. A two coordinate positioning system as defined in claim 1, wherein said passive component comprises a hollow cylinder provided on the inner surface thereof with parallel ridges extending in the direction of the axes of said hollow cylinder and being spaced in circumferential direction from each other, and wherein said hollow cylinder is provided on the outer surface thereof with annular ridges spaced in the direction of said axis from each other, wherein said first electromagnetic coil system is mounted in a cylindrical part located within said hollow cylinder and having on the outer surface thereof circumferentially spaced ridges parallel to those on the inner surface of said hollow cylinder, and wherein said second electromagnetic pole system is mounted in a pole ring enclosing said hollow cylinder, the inner surface of said pole ring being provided with annular ridges spaced in the direction of said axis for each other, said connecting member connecting said cylindrical part and said pole ring to each other.

10. A two coordinate positioning system as defined in claim 9, wherein said connecting member is stationarily mounted and said passive component being movable along the Z-coordinate and the φ-coordinate of a system of cylindrical coordinates.

11. A two coordinate positioning device as defined in claim 1, wherein said ridges are uniformly spaced from each other and separated by grooves, and including non-magnetizable material filling said grooves.

* * * * *